July 20, 1937.  A. ALESSI-GRIMALDI  2,087,684

HUB

Original Filed May 10, 1935  2 Sheets-Sheet 1

Inventor:
Antonino Alessi-Grimaldi
By Mauro & Lewis
Attorneys

July 20, 1937.  A. ALESSI-GRIMALDI  2,087,684
HUB
Original Filed May 10, 1935   2 Sheets-Sheet 2
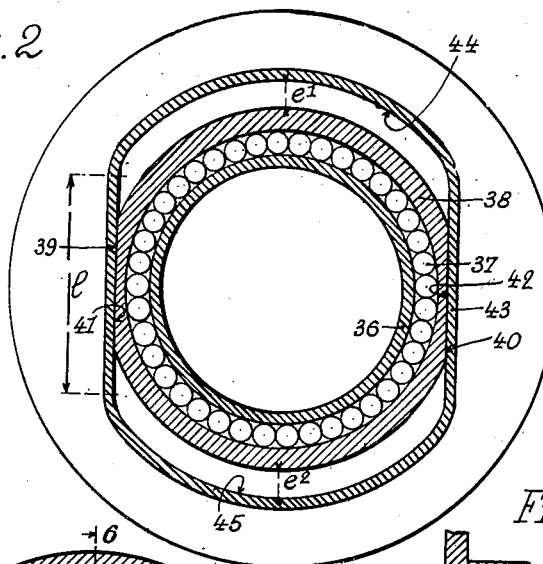
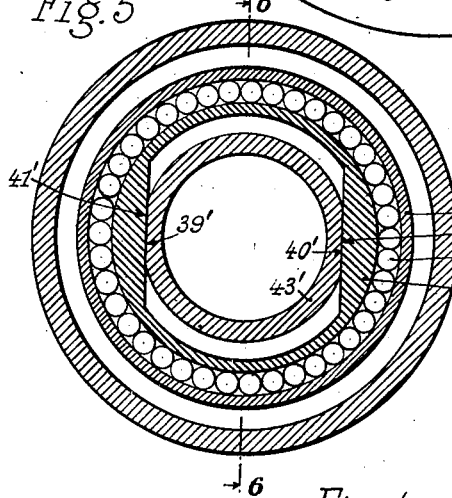
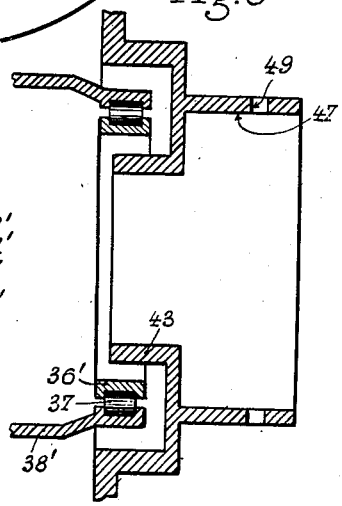
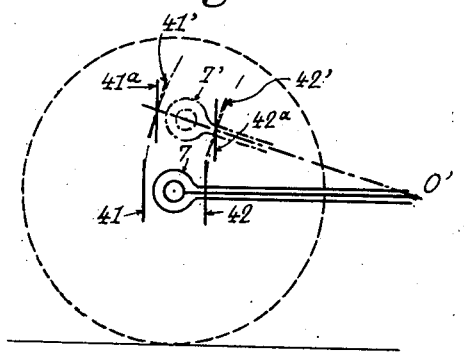
Inventor
Antonino Alessi-Grimaldi
By Mauro + Lewis
Attorneys Patented July 20, 1937

2,087,684

UNITED STATES PATENT OFFICE 2,087,684

HUB

Antonino Alessi-Grimaldi, Courbevoie, France

Application May 10, 1935, Serial No. 20,877. Renewed March 1, 1937. In France May 12, 1934

7 Claims. (Cl. 301—1)

The present invention relates to hubs for wheels having a wide rim or twin rims of the type including a swivel and vertical guiding means arranged in such manner that the wheel can, at any time, by oscillating about a horizontal axis at right angles to the longitudinal axis of the axle, assume a position perpendicular to the surface of the road, whatever be the transverse inclination of the portion of said road surface upon which the wheel or the twin wheels are bearing.

The object of the present invention is to provide a hub of the type above mentioned which is better adapted to meet the requirements of practice than hubs of this type made up to this time.

According to a first feature of the present invention, the vertical guiding of the part mounted on the swivel joint is ensured through a bearing, preferably a roller bearing, one of the races of which is provided with two vertical flat guiding surfaces cooperating with suitable slideways, while the other race is rigid or integral with said part mounted on the swivel joint.

According to another feature of the present invention the guiding member which carries these slideways is mounted in an oscillating manner on a cylindrical bearing of the axle or of the axle casing in such manner that these slideways may remain vertical whatever be the angular position of the axle or of the axle casing in the course of the displacements of the wheels with respect to the vehicle body corresponding to deformations of the suspension springs.

According to still another feature of the invention, this guiding member serves also to maintain in correct axial position the brake drum.

Preferably, a shock absorbing device brakes the oscillations of the hub. This shock absorbing device consists for instance of an elastic annular member inserted between the web of the wheel, or of one of the wheels in the case of twin wheels, and the annular element that carries the brake drum.

Other features of the present invention will result from the following detailed description of specific embodiments thereof.

Preferred embodiments of the present invention will be hereinafter described with reference to the accompanying drawings, given merely by way of example, and in which:

Fig. 2 is a cross section on the line 2—2 of Fig. 1;

Fig. 4 is a diagrammatical view explaining the advantage of the oscillating connection of the guiding member with the axle casing;

Fig. 5 is a sectional view analogous to Fig. 2, showing a modification;

Fig. 6 is a sectional view on the line 6—6 of Fig. 5.

Figures 1, 3:
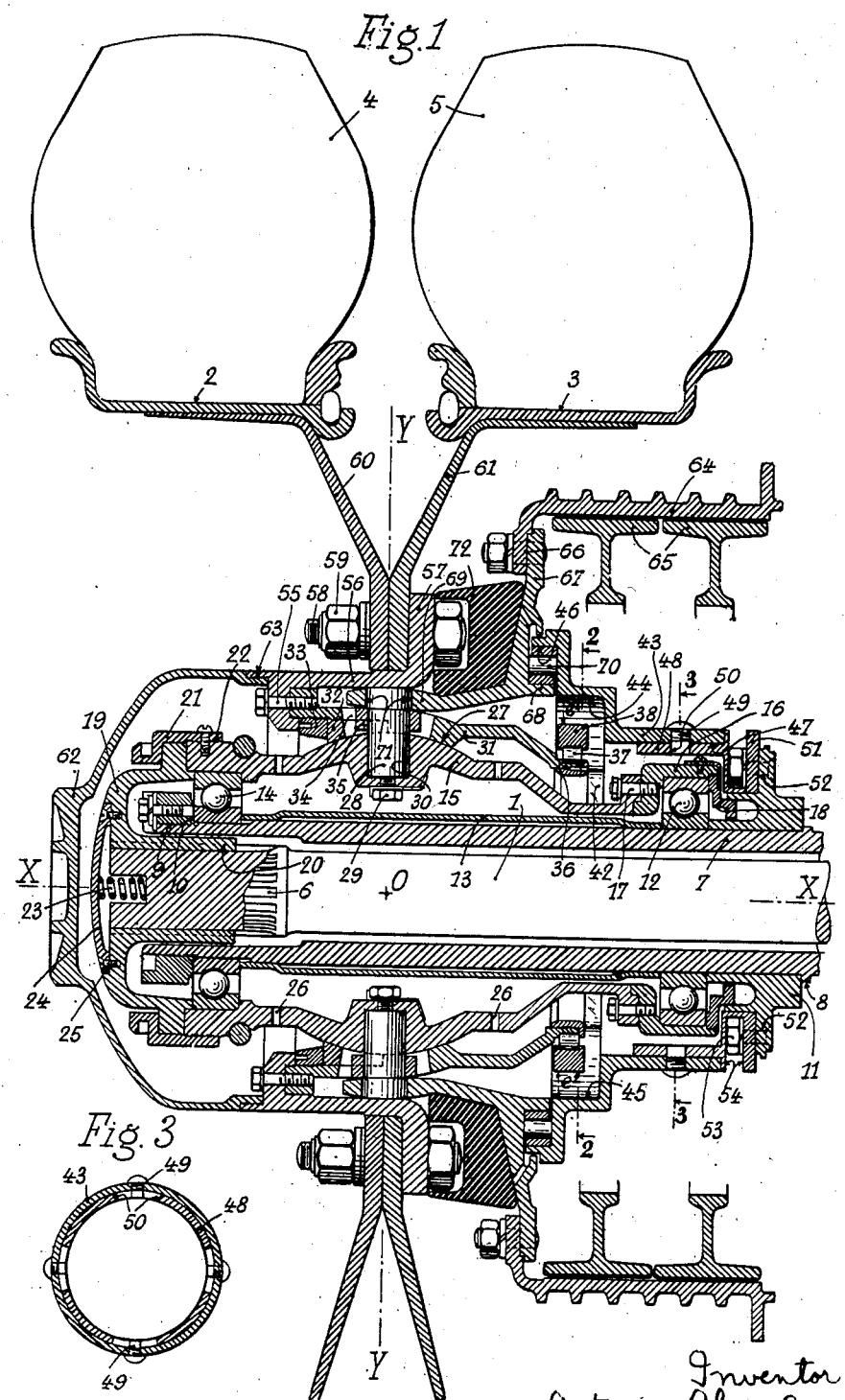
Fig. 1 is a vertical sectional view of a hub according to the present invention.
Fig. 3 is a cross sectional view on the line 3—3 of Fig. 1, but on a reduced scale.

In the embodiment shown in Figs. 1 to 3 the driving axle 1 must transmit a rotary movement to a wheel including twin rims 2 and 3, provided with pneumatic tires 4 and 5, or the like.

The axle 1, which is provided at its outer end with longitudinal grooves 6 for transmitting the rotary motion, is housed, in the usual manner, inside an axle casing 7 which is provided at 8 with a shoulder and the outer end of which is threaded as shown at 9. A system including a ring-shaped member 11, a ball bearing 12, a tube 13 acting as a distance member, and a second ball bearing 14 is applied against this shoulder 8 by means of a nut 10 screwed upon the threaded end 9 of the axle casing 7.

Between the respective outer races of the ball bearings 12 and 14, there is interposed a member 15 of the shape of a body of revolution about the axis X—X of axle 1. This member 15 may be mounted directly upon the outer race of ball bearing 12. But, in the embodiment shown in the drawings, there is interposed, between this outer race and member 15, a member 16 fixed to member 15 by means of screws 17. A threaded ring 18 screwed in this member 16 fixes the outer race of ball bearing 12 with respect to the whole of parts 15 and 16, which facilitates the assembly. The whole of the parts 18—16—15—12 is mounted in position after ring 11 has been mounted on axle casing 7. The tube 13 and ball bearing 14 are placed and the whole is fixed in position by means of nut 10.

Member 15 is connected with axle 1, in such manner to rotate together with it, for instance through a cap 19 fitted upon the end of axle 1 and provided with internal longitudinal ribs 20 which engage in grooves 6. This member 19 is connected to member 15, for instance through a ring 21 screwed at 22 on this member 15.

Preferably, a spring 23 is interposed in a known manner between the end of the axle 1, in which it is engaged, and a plate 24, fixed by means of screws 25 or otherwise on connecting piece 19. This spring 23 is intended to prevent any longitudinal displacement of axle 1.

Member 15, which is provided with holes 26 for the passage of a lubricant, is provided, outwardly, with a spherical surface 27 the center of which is located at 0 on the axis X—X of the axle 1. In a transverse plane Y—Y, at right angles to axis X—X, and passing through this center 0, are located the axes of pins 28, fixed for instance by means of nuts 29 to member 15, in which they are preferably engaged at 30. There may be provided two, three, or even more, of these pins 28.

On the spherical surface 27 there is mounted an oscillating system having an inner spherical surface the center of which is at O and the radius of which is equal to the radius of spherical surface 27. This oscillating system includes, in order to permit of assembling the parts, two elements 31 and 32 connected together by means of a nut 33. Element 31 is provided with longitudinal slots 34, of rectangular shape, through each of which passes a pin 28 rigid with member 15. Preferably, a piece 35 having, in plan view, a square outline is interposed between each pin 28 and the edges of the corresponding slot 34, the width of said piece 35 being equal to that of said slot 34, while the slot is longer than piece 35. Element 31 is prolonged so as to form the inner race (Figs. 1 and 2) of a roller, needle, or similar bearing 37. The outer race 38 of this bearing is provided with two flat surfaces 39 and 40 (Fig. 2) parallel to each other and diametrally opposed. These flat surfaces are in cooperating contact with the guiding flat surfaces or slideways 41 and 42 of a member 43. These surfaces 41 and 42, which are parallel to the axis are of a vertical length $l$ (Fig. 2) such that there exist relatively important clearance spaces ($e^1$ and $e^2$, Figs. 1 and 2) between the outer race 38 and the surfaces 44 and 45, either circular or of some other shape, through which surfaces 41 and 42 are connected together.

Member 43 is prolonged, on either side of portion 41—42—44—45 thereof, with cylindrical portions 46 and 47, coaxial with the axle 1. Through cylindrical portion 47, guiding member 43 is centered about the cylindrical bearing of a piece 48, also coaxial with the spindle. Pieces 43 and 48 cannot move with respect to each other in the direction of axis X—X. But member 43 can oscillate about member 48 owing to the provision of lugs 49 (Figs. 1–3) screwed in member 43 and engaged through slots 50 extending in the circular direction and provided in member 48.

This member 48 is provided with a base 51 (Fig. 1) through which it is fixed on ring 11, which is axially mounted on axle casing 7 against the shoulder 8 on which it bears. Member 48 is fixed on ring 11 by means of stud bolts 52 and nuts 53. Preferably, in order to avoid the necessity of making holes extending throughout member 48, nuts 53 are housed in recesses 54 provided in the outer part of bases 51. Pieces 43 and 48 are arranged in such manner that, account being taken of the fact that piece 43 can turn through a certain angle (corresponding to the angular length of slots 50) with respect to member 48, guiding faces 41 and 42 can, by oscillation of said piece 43 with respect to piece 48 come into a vertical position and remain in vertical position in spite of any possible oscillations of piece 48 about axis X—X.

On the oscillating system 31—32 there is fixed, for instance by means of screws 55, a cylindrical member 56 provided with an annular flange 57 on which the flanges 60 and 61 of the twin rims 2 and 3 are fixed, by means of bolts 58 and nuts 59. Furthermore, a cover 62, screwed at 63 on member 56 protects the whole of the mechanism above described.

The device is completed by a brake drum 64, intended to cooperate with brake shoes 65. This drum 64 is fixed, at 66, on a flange 67 prolonged by two cylindrical parts 68 and 69 coaxial with the axle 1. Cylindrical portion 68 forms the inner race of a roller bearing 70 the outer race of which consists of the portion 46 of guiding member 43. As for part 69, it is provided with holes 71 through which extend the ends of pins 28.

Finally, an annular member 72, made of an elastic material (rubber or the like) either solid or hollow, (or any other shock absorbing elastic device, including springs, for instance) is interposed between flange 57 and flange 67.

The operation of the device is the following: The rotation of the wheel about axis X—X is transmitted from axle 1 through ribs 6 and 20, piece 19, piece 15 journalled on bearings 12 and 14, pins 28 and pieces 31—32. It should be noted that, in the case of a wheel that is not to be driven by its axle, only the connection 6—20—19 is to be done away with. In this case, the wheel would turn freely, being journalled about bearings 12 and 14. In the embodiment shown in the drawings, the drum 64 of the brake, centered in piece 43, is also caused to rotate together with the axle.

If the surface of the road on which the wheel is bearing is parallel to axis X—X, pieces 31—32 occupy, on member 15 the position shown in the drawings. If, on the contrary, the surface of the road is inclined with respect to axis X—X, the whole of the parts 31—32—56—60—61 becomes inclined with respect to axis X—X, by rotation of pieces 31 and 32 about the center of the spherical portion of piece 15. Owing to the guiding action of vertical faces 41 and 42 of piece 43, bearing 36—37—38 can move only in a vertical direction, so that, in point of fact, the wheel can oscillate only about a horizontal axis at right angles to axis X—X passing through center O. Owing to this rotation, the wheel assumes a position at right angles to the surface of the road on which it bears, in such manner that the whole of its outer periphery bears upon the ground. The maximum load that can be supported by the wheel is thus considerably increased.

Owing to the presence of bearing 36—37—38, the frictional stresses due to the rotation of the wheel are eliminated between piece 31 and the surfaces 41—42 of piece 43, the wear and tear of which is thus considerably reduced.

On the other hand, owing to the provision of the slots 50 of piece 48, piece 43 can oscillate with respect to axis X—X, in such manner that the guiding surfaces 41—42 remain vertical whatever be the angular displacement of the axle casing 7 and of piece 48 resulting from the rotation of the whole of the axle and its transmission shaft about the center O' (Fig. 4) of the front Cardan joint, when the rear wheel or wheels passes over an obstacle. This is due to the fact that when the axle casing 7 comes into position 7' (Fig. 4) surfaces 41 and 42, instead of assuming the inclined positions 41'—42' that they would be given if they were angularly connected with casing 7, come into vertical positions $41^a$—$42^a$, under the action of the faces 39 and 40 of the outer race 38. As a matter of fact, the whole is free to turn and tends to assume the position of equilibrium for which piece 43 is in the lowest possible position. It is clear that this position can be obtained only when surfaces 39, 40, 41, and 42 are vertical.

In Figs. 5 and 6 I have shown a modification in which the flat surfaces $39^1$ and $40^1$ are carried by the inner race $36^1$ of the roller bearing cooperating with the corresponding surfaces $41^1$ and $42^1$ of piece $43^1$, the outer race $38^1$ of this bearing being, on the contrary, rigid with the oscillating piece 31.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A hub for a wheel having a wide rim or twin rims to be mounted on an axle including a nonrotary axle element, which comprises, in combination, a first hub element journalled about said axle element coaxially therewith, a second hub element rotatable with respect to said first hub element about a horizontal axis at right angles to said axle, and angularly connected with said first hub element about the axis of said axle, a bearing including two races one of which is rigid with said second mentioned hub element, and means carried by said axle member for guiding the other race of said bearing in a vertical direction.

2. A hub for a wheel having a wide rim or twin rims to be mounted on an axle including a nonrotary axle element, which comprises, in combination, a first hub element journalled about said axle element coaxially therewith, a second hub element rotatable with respect to said first hub element about a horizontal axis at right angles to said axle, and angularly connected with said first hub element about the axis of said axle, a bearing including two races one of which is rigid with said second hub element, the other race having two plane parallel surfaces, and a guiding member having two plane parallel surfaces arranged to cooperate with said first mentioned surfaces respectively, said guiding member being rotatably carried by said axle element about the axis thereof, whereby said surfaces remain vertical whatever be the angular position of the axle element.

3. A hub according to claim 2 further including a brake drum carried by said first hub element, and means carried by said guiding member for maintaining said brake drum in coaxial relation with respect to said axle.

4. A hub according to claim 2 further including means for braking the oscillations of the second hub element with respect to the first hub element.

5. A hub according to claim 2 including an annular flange rigid with said second hub element, a brake drum, a flange carrying said brake drum carried by said first hub element, and an annular elastic member interposed between these two flanges.

6. A hub according to claim 2 in which said first mentioned parallel plane surfaces are provided on the outer periphery of the outer race of said bearing.

7. A hub according to claim 2 in which said first mentioned parallel plane surfaces are provided on the inner periphery of the inner race of said bearing.

ANTONINO ALESSI-GRIMALDI.